(12) United States Patent
Picot et al.

(10) Patent No.: US 6,830,219 B1
(45) Date of Patent: Dec. 14, 2004

(54) FUEL INERTING SYSTEM

(75) Inventors: Christine Picot, Bristol (GB); Michael D Ward, Bristol (GB)

(73) Assignee: Bae Systems plc, Farnborough (GB)

( * ) Notice: Subject to any disclaimer, the term of this patent is extended or adjusted under 35 U.S.C. 154(b) by 0 days.

(21) Appl. No.: 10/182,277

(22) PCT Filed: Jan. 23, 2001

(86) PCT No.: PCT/GB01/00220

§ 371 (c)(1),
(2), (4) Date: Jul. 26, 2002

(87) PCT Pub. No.: WO01/54979

PCT Pub. Date: Aug. 2, 2001

(30) Foreign Application Priority Data

Jan. 26, 2000 (GB) .............................................. 0001649

(51) Int. Cl.[7] .............................................. B64D 37/32
(52) U.S. Cl. .................................. 244/135 R; 244/121
(58) Field of Search ......................... 244/135 R, 135 B, 244/121

(56) References Cited

U.S. PATENT DOCUMENTS

| | | | |
|---|---|---|---|
| 3,691,730 A | * | 9/1972 | Hickey et al. ................. 96/161 |
| 3,693,915 A | * | 9/1972 | Ulanovsky ............... 244/135 R |
| 3,710,549 A | | 1/1973 | Nichols et al. |
| 3,732,668 A | | 5/1973 | Nichols |
| 3,788,039 A | | 1/1974 | Bragg |
| 4,378,920 A | | 4/1983 | Runnels et al. |
| 4,556,180 A | * | 12/1985 | Manatt ..................... 244/135 R |
| 6,136,267 A | * | 10/2000 | Bergman ...................... 422/41 |
| 6,293,525 B1 | * | 9/2001 | Ginsburgh et al. ............ 261/77 |

FOREIGN PATENT DOCUMENTS

| | | | |
|---|---|---|---|
| EP | 0 867 367 A | 9/1998 | |
| EP | 867367 A2 | * 9/1998 | ........... B64D/37/32 |
| GB | 1 331 735 | 9/1973 | |
| GB | 1 331 736 | 9/1973 | |
| GB | 1 384 913 | 2/1975 | |
| WO | 00 00389 A | 1/2000 | |

* cited by examiner

Primary Examiner—Peter M. Poon
Assistant Examiner—Timothy D. Collins
(74) Attorney, Agent, or Firm—Nixon & Vanderhye P.C.

(57) ABSTRACT

A fuel inerting system, comprising a first supply means (2) to supply an inert gas to a fuel tank (8) to scrub the fuel therein when the ullage (16) of the fuel tank is inert, and a second supply means (4) to supply the inert gas to scrub the fuel (6) therein when the ullage of the fuel tank is not inert, the first and second supply means (2, 4) being individually operable by means of a valve arrangement (10), in such a manner that only one of the supply means is operable at any given time. The inert gas consists of nitrogen enriched air, produced by passing air from a pressurized area of the aircraft through a nitrogen separator located within, but removable from, the aircraft.

11 Claims, 1 Drawing Sheet

FUEL INERTING SYSTEM

Figure 1:
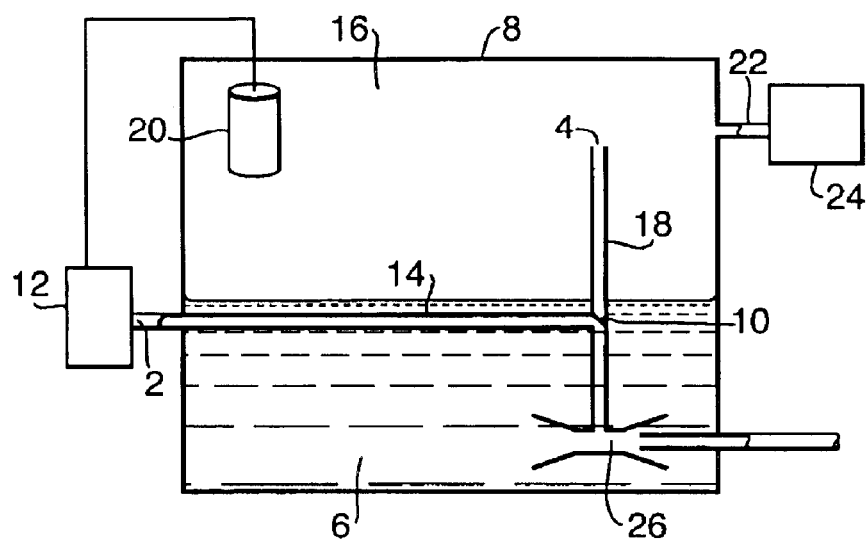

This application is the US national phase of international application PCT/GB01/00220 filed 23 Jan. 2001, which designated the US.

The present invention relates to a fuel inerting system, and in particular to a system that combines both fuel inerting and fuel scrubbing techniques.

It is vital to minimise the risk of fire in the fuel tanks of aeroplanes. This is particularly important in military aircraft where there is a fire risk during battle. The risk of a fire is substantially reduced by providing a flow of inert gas, usually Nitrogen Enriched Air (NEA), into the ullage space above the fuel in each fuel tank. Ullage, for the purposes of this specification, refers to the part of a fuel tank that is not filled with fuel. It is also important to carry out a process known as scrubbing in which dissolved oxygen in the fuel is displaced by mixing NEA with the oxygenated fuel.

One method of scrubbing fuel is to use the motive force of the fuel entering a tank during refuelling to power a centrifugal separator, or another type of mixer, using jet-pump action. This draws the NEA from the tank ullage in order to displace oxygen from the fuel. An alternative method of scrubbing is to introduce pressurised NEA directly into the tank.

The present invention provides a fuel inertion system that combines the two aforementioned methods, thereby providing a single inertion and scrubbing system which can be employed in either condition.

Accordingly, there is provided, a fuel inertion and scrubbing system, comprising a first supply means to supply an inert gas to a fuel tank to scrub the fuel therein when the ullage of the fuel tank is inert, and a second supply means to supply the inert gas to scrub the fuel therein when the ullage of the fuel tank is not inert, the first and second supply means being individually operable by means of a valve arrangement, in such a manner that only one of the supply means is operable at any given time.

In such a combined system, when the ullage is inert, for example during normal air-to-air refuelling, scrubbing of the fuel as it enters the aircraft is carried out using a mixer, for example a jet-pump mixer, drawing NEA from the ullage. However, when the ullage is not inert, for example during initial fuelling for a tactical military mission, scrubbing of the fuel is carried out using a pressurised NEA supply. The operation of the two systems is selected by a valve arrangement.

Current systems, like that used, for example, on a Boeing C-17 aircraft, incorporate a nitrogen separator and a storage system for the inert gas, both of which are fixed within the aircraft structure. Pressurised air from the aircraft engines is then used as a supply to the nitrogen separator.

The present invention also provides a system that incorporates a separator and an inert gas storage system which is carried in the aircraft cargo bay or other pressurised area of the aircraft, and which can be removed when the system is no longer required. The present system takes air from the aircraft pressurised cabin via the cargo bay, or other pressurised area, and compresses it using a separate compressor before supplying the air to the separator. As a result of this portable system, it is possible to operate a separator that is normally ground-based in flight at altitude.

Preferably, the first supply means consists of a jet-pump mixer drawing the inert gas from the ullage, and the second supply means consists of a supply of pressurised inert gas.

Preferably, the inert gas is Nitrogen Enriched Air.

The valve arrangement preferably consists of a pressure-actuated priority valve operable so as to shut off flow of the inert gas from the ullage to the jet pump mixer.

An oxygen sensor is preferably provided within the ullage of the fuel tank. The oxygen sensor measures the oxygen content of the gas in the ullage and from this, the inertness of the ullage area can be found.

The pressurised inert gas supply can be switched on and off either manually or automatically.

It is favourable for the system to further comprise a nitrogen separator and an inert gas store which take their air supply in flight from the aircraft pressurised cabin, and are portable and can be removed from the aircraft when no longer required.

A fuel inerting and scrubbing system according to the present invention will now be described, by way of example, with reference to the accompanying drawing, the single FIGURE of which is a schematic representation of the system.

During refuelling on the ground, air is vented out from the ullage via an outlet in the fuel tank and a surge tank, and replaced by fuel. Air remaining in the ullage is replaced by NEA. An on-board inert gas generating system then operates to maintain a layer of inert gas, such as Nitrogen Enriched Air (NEA) within the fuel tanks. The NEA is produced from the engine bleed air using a nitrogen separator (not shown).

Referring now to the drawing, the system comprises two separate supply means 2, 4, for supplying NEA to fuel 6 within a fuel tank 8. The first supply means 2 is connected to a pressurised supply 12 of NEA which flows along a first supply line 14 to the fuel 6 within the fuel tank 8, via a priority valve 10. The second supply means 4 provides a supply of NEA from the fuel tank ullage 16 along a second supply line 18 to the fuel 6 within the fuel tank 8, via the priority valve 10. Either supply means 2, 4 uses a jet-pump mixer 26 that uses the NEA to displace dissolved air from the fuel and vent it overboard 28.

The priority valve 10 has two operating positions. The first operating position of the valve, which is shown in the drawing, opens the first supply line 14, allowing the flow of NEA from the pressurised supply 12 to the fuel 6, while, at the same time, closing the second supply line 18 so as to prevent NEA from the fuel tank ullage 16 flowing into the fuel. The second operating position of the valve, closes the first supply line 14 preventing the flow of pressurised NEA into the fuel 6, while, at the same time, opening the second supply line 18, thus allowing flow of NEA from the fuel tank ullage 16 into the fuel.

One possible means for operating the priority valve is now described. The system is arranged such that the pressure in the pressurised supply 12 is higher than the pressure in the ullage 4, When the pressure from the pressurised supply 12 is applied to the priority valve 10, by opening a shut-off valve 27 located on the first supply line 14, the priority valve 10 is positioned as shown in the FIGURE. When the shut-off valve 27 is closed, the priority valve 10 reverts to its second operating position.

The quantity of inert gas which needs to be supplied to the fuel tank 8 depends on the maximum required oxygen concentration in the fuel tank's ullage 16. An oxygen sensor 20 may be provided within the ullage space 16 of the fuel tank 8 to measure the oxygen concentration in that area. The sensor 16 is linked to the first supply means 2 so as to shut off the supply line 14 when the oxygen concentration is reduced to a required level.

The NEA is stored under pressure in pressure vessels so as to reduce the volume of the amount of gas to be stored. The standard storage pressure of NEA is 200 bar (approximately 3000 psi). The pressure of the NEA is regulated and reduced to an intermediate level using a high pressure regulating shut-off valve (not shown).

An outlet 22 is provided within the fuel tank which allows the NEA to flow to and from a surge tank 24 (or vent box). During aircraft operation, NEA fills the ullage space 16 in the fuel tank 8 via the surge tank 24. NEA flows out of the ullage space 16 during the aircraft's ascent and into the ullage space during descent as a result of the changes in the outside ambient pressure.

The pressure formed within the surge tank 24 is regulated using a low pressure regulating shut-off valve (not shown), which keeps the pressure at a required level, regardless of the flow rate of the gas to the surge tank.

A scrubber 26 is provided within the fuel tank 8 in order to displace excess oxygen from the fuel 6.

As fuel 6 from the fuel tank 8 is consumed, the pressure within the fuel tank drops and NEA is required to be supplied to the tank so as to stabilise the pressure variation. Pressure is maintained in the ullage space 16 above the fuel tank 8 by means of an outward vent valve and an inward vent valve (both not shown). The outward vent valve acts as a relief valve to vent NEA from the tank 8 thereby to limit the positive differential pressure between the fuel system and the outside ambient pressure during the aircraft's ascent. The inward vent valve limits the negative differential pressure during the aircraft's descent by allowing outside air to enter the ullage 16 during descent as a result of changes in outside ambient pressure.

It is beneficial to maintain a positive pressure difference between the fuel tank 8 and the ambient outside pressure during the aircraft's ascent as the difference between the pressure at sea level and cruise level will be reduced resulting in a reduction in the quantity of inert gas that needs to be supplied.

The nitrogen separator and the NEA pressurised vessels are stored in the aircraft cargo bay. They may then be disengaged from the overall fuel inerting system and can be removed from the aircraft system when they are not required. Furthermore, the air taken from the cargo bay, or other pressurised area, is compressed separately using a standard compressor before being supplied to the nitrogen separator in order to produce the NEA. As a result of taking air from the cargo bay, or other pressurised area, as opposed to outside the aircraft, it is possible to operate a standard separator that is normally ground-based, during flight at high altitude. This is not possible in systems having a fixed nitrogen separator and pressurised vessels which require pressurised air from the aircraft's engines as a supply to the nitrogen separator.

What is claimed is:

1. A fuel inerting system comprising:
   a first supply means to supply an inert gas to a fuel tank to scrub the fuel therein when the ullage of the fuel tank is not inert,
   a second supply means to supply the inert gas to scrub the fuel therein when the ullage of the fuel tank is inert,
   an oxygen sensor linked to the second supply means and located within the fuel tank ullage to measure the oxygen concentration; and
   a valve arrangement, responsive to said oxygen sensor, for interconnecting said first supply means to said fuel tank and for interconnecting said second supply means to said fuel tank, wherein only one of the first supply means and second supply means is operable at any given time, wherein the second supply means is automatically operated with regard to an output of the oxygen sensor.

2. A fuel inerting system according to claim 1, wherein the valve arrangement consists of a pressure-actuated priority valve.

3. A fuel inerting system according to claim 2, wherein the first supply means consists of a mixer drawing the inert gas from the ullage.

4. A fuel inerting system according to claim 3, wherein the second supply means consists of a supply of pressurised inert gas.

5. A fuel inerting system according to claim 1, further comprising means for producing the inert gas from air taken from within an aircraft pressurised area.

6. A fuel inerting system according to claim 5, wherein the air is taken from a pressurised cargo bay.

7. A fuel inerting system according to claim 5, wherein the inert gas is produced by means of a nitrogen separator located within, but removable from, the aircraft.

8. A fuel inerting system according to claim 1, further comprising means for storing the pressurised inert gas.

9. A fuel inerting system according to claim 8, wherein the storage means is located within, but removable from, the aircraft.

10. A fuel inerting system according to claim 1, wherein the first and second supply means may be operated manually.

11. A fuel inerting system according to claim 1, wherein the inert gas consists of nitrogen enriched air.

* * * * *